LA VERNE NOYES.
WINDMILL.
APPLICATION FILED OCT. 7, 1914.
1,163,681.
Patented Dec. 14, 1915.
2 SHEETS—SHEET 1.
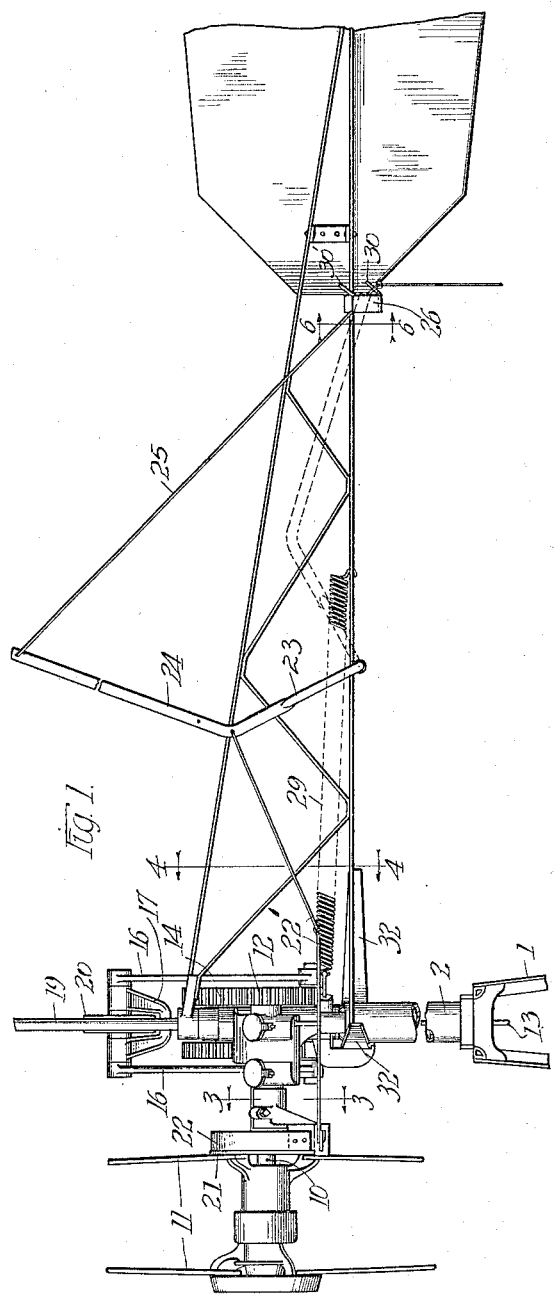
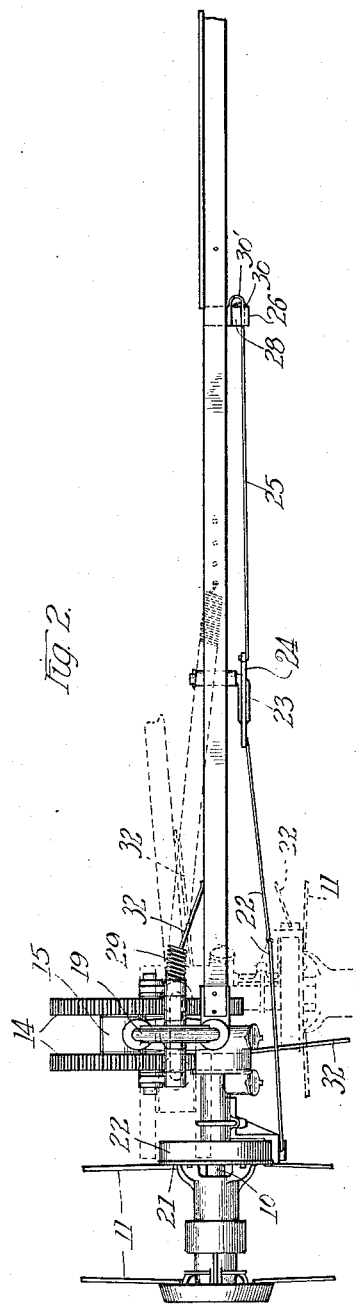
Witnesses:
Arthur W. Carlson
Robert A. Weir
Inventor
LaVerne Noyes
By G. L. Cragg Atty.

LA VERNE NOYES.
WINDMILL.
APPLICATION FILED OCT. 7, 1914.
1,163,681.
Patented Dec. 14, 1915.
2 SHEETS—SHEET 2.
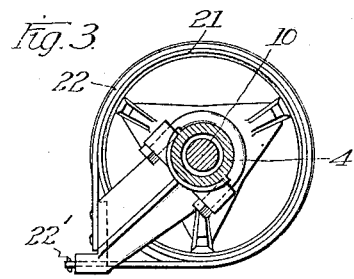
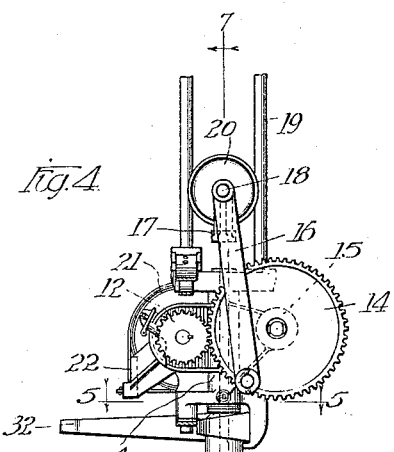
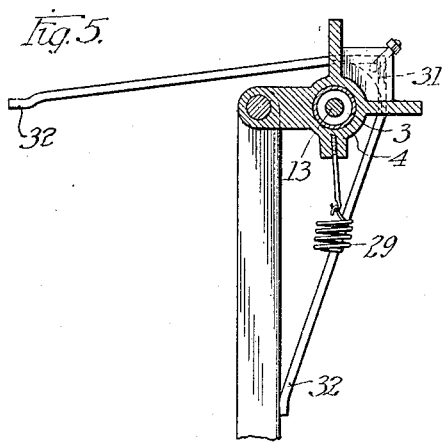
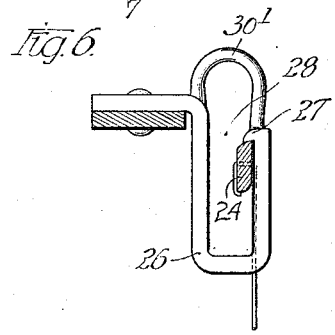
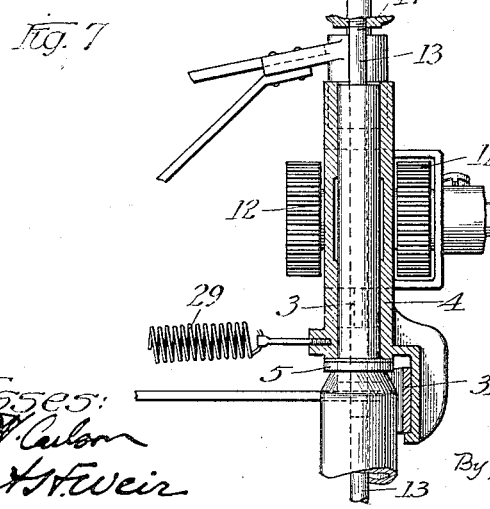

UNITED STATES PATENT OFFICE.

LA VERNE NOYES, OF CHICAGO, ILLINOIS, ASSIGNOR TO AERMOTOR COMPANY, OF CHICAGO, ILLINOIS, A CORPORATION OF ILLINOIS.

WINDMILL.

1,163,681.  Specification of Letters Patent.  Patented Dec. 14, 1915.

Application filed October 7, 1914. Serial No. 865,453.

*To all whom it may concern:*

Be it known that I, LA VERNE NOYES, a citizen of the United States, residing at Chicago, in the county of Cook and State of Illinois, have invented a certain new and useful Improvement in Windmills, of which the following is a full, clear, concise, and exact description, reference being had to the accompanying drawings, forming a part of this specification.

My invention relates to wind mills, having several objects in view.

In accordance with one of the objects of my invention there is provided a brake structure which includes one member that is suitably coupled with the wind wheel to be turned thereby when the brake is idle and to check the rotation of the wind wheel when the brake is in action, a complemental brake member being suitably mounted upon the mill head and affording a medium through which the mill vane shifting mechanism has connection with the mill head.

In the preferred embodiment of the invention the brake member which is coupled with the wind wheel is carried by and is coaxial with the wind wheel hub, this brake member being desirably in the form of a brake drum which is encircled by a brake band having one end anchored to the mill head and the other end connected with the mill vane by a contractible and extensible connection, governed at the base of the mill. When the connection between the brake band and the mill vane is sufficiently shortened or contracted the wind wheel and mill vane are turned into angular relation to bring the wind wheel out of the wind, and inasmuch as this angular relationship of the mill vane and wind wheel is established and maintained by force supplied through the intermediation of the brake band such brake band is then placed in gripping engagement with the brake drum to prevent the wind wheel from rotating while out of the wind. When the wind wheel is to be placed in the wind the connection between the brake band and the mill vane is relaxed to permit the vane to shift and bring it into parallelism with the wind wheel axis, in which readjustment the brake band is released from braking engagement with the brake drum.

In accordance with another feature of my invention I provide improved buffers for yieldingly limiting the swinging movements of the mill vane with respect to the wind wheel and mill head, these buffers being in the form of leaf springs which are suitably anchored to the mill head and whose free ends are arranged to be suitably engaged by the mill vane.

In accordance with another feature of my invention I provide an improved latching mechanism which is to be employed with the preferred form of lever mechanism which is used to bring the wind wheel into and out of the wind, this latching mechanism being carried by the mill vane and being so constructed and positioned that the lever mechanism may be readily latched to maintain the wind wheel out of the wind, and may readily be released to permit the wind wheel to assume its position in the wind.

I will explain my invention more fully by reference to the accompanying drawings showing the preferred embodiment thereof and in which—

Figure 1 is a side elevation of the upper portion of a wind mill structure, a part of the mill vane being broken away; Fig. 2 is a plan view of the structure illustrated in Fig. 1; Fig. 3 is a sectional view on line 3 3 of Fig. 1; Fig. 4 is a sectional view on line 4 4 of Fig. 1; Fig. 5 is a sectional view on line 5 5 of Fig. 4; Fig. 6 is a sectional view on line 6 6 of Fig. 1; and Fig. 7 is a sectional view on line 7 7 of Fig. 4.

Like parts are indicated by similar characters of reference throughout the different figures.

The top of the tower 1 terminates in an upright stationary tubular column 2 whose reduced upper end constitutes an upright shaft 3 affording an upright axis about which the wind mill head 4 may turn upon a step bearing ring 5 that is supported upon the lower column portion. The shaft 10 of wind wheel 11 is journaled on the head 4 and carries two upright pinions 12 for driving the upright pump or load rod 13. Upright transmission gears 14 are in mesh with pinions 12 and are journaled within a bearing 15 carried by the head 4. Pitmen 16 connect gears 14 with the upper end of the load rod 13. A stirrup 17 is fixed upon the upper end of the load rod and carries bearings in which a shaft 18 turns. The outer ends of this shaft are in fixed connection with the upper ends of the pitmen 16 whereby the pitmen are maintained in proper interrelation without relying upon a guide structure to perform this function. The gears and pitmen are equi-distant from a plane parallel to the gears and which plane includes the axis of the load shaft whereby the driving force upon the load rod is evenly distributed. The head 4 carries an upright stirrup 19 whose parallel branches constitute upright guides that are simultaneously received in the groove of an antifriction wheel or roller 20 that turns on and with respect to the shaft 18. Said roller is permitted very slight bodily movement in the plane of the stirrup 19 so that it may have rolling engagement with but one vertical branch of said stirrup at a time.

Features of construction thus far specifically described form the subject matter of my co-pending applications Serial No. 830,627, filed April 9, 1914, and Serial No. 865,451, filed October 7, 1914, and while my present invention is desirably incorporated in a wind mill having these features of construction I do not wish to be limited to such an embodiment of the invention.

The hub of the wind wheel carries a brake drum 21 coöperatively related with a brake band 22, one end of the brake band being rigidly secured to the mill head 4 while the free end of the brake band is placed in connection with the mill vane by means of a chain of links 22' which is extensible and contractible. One of the links in said chain includes the section 23 of a lever that is pivoted at its lower end upon the mill vane, the remaining lever section 24 being connected with a pulling element 25 desirably in the form of a string which is preferably made of wire and that terminates near the base of the wind mill whereby the position of the lever may be adjusted from the ground. A latch 26 is mounted upon the mill vane, the engaging nose 27 of the latch being in the normal plane of the lever. The lever section 24 is placed into engagement with the latch by so pulling upon the wire 25 as temporarily to bring the lever section 24 into alinement with the open space 28, the lever section 24 being guided through the space 28 to a position beneath the latch nose 27 by suitable manipulation of the wire 25. The nose 27 desirably slopes downwardly in order to assist in the deflection of the lever section 24 from its normal plane in the movement of this lever section to its retained position beneath the latch nose. When the lever section 24 is latched by being placed in engagement with the nether surface of the nose 27, the flexible connection between the brake band 22 and the mill vane has become shortened to force the mill vane to swing upon its mounting on the mill head whereupon the mill vane and wind wheel are brought into that angular relation in which the wind wheel is out of the wind. The force which is necessary to bring and maintain the wind wheel out of the wind is sufficient to cause the application of braking pressure by the brake band upon the brake drum then to cause the wind wheel to be checked from rotation while out of the wind, the application of this braking pressure being maintained owing to the continued engagement of the lever section 24 with the latch nose 27. When the wind wheel is to be restored to its position within the wind the wire 25 is pulled downwardly and sidewise to bring the lever section 24 into alinement with the space 28 whereupon pull upon the wire is sufficiently relaxed to permit the counter clockwise movement of the lever, in which movement the connection between the brake band and mill vane is sufficiently relaxed to permit the spring 29 to move the mill vane from its closed position toward the wheel to its open position away from the wheel into parallelism with the axis of the wind wheel. When the wind wheel is thus placed in the wind the flexible connection between the mounting for the lever and the brake band is maintained sufficiently slack to prevent the accidental application of the brake band to the brake drum while the mill is in operative adjustment. In order to prevent excessive slack in the connection between the mill vane and the brake band the upper link section of the wire 25 carries a guard 30 which engages the latch structure thereby to limit the extent to which the lever may move in a counter-clockwise direction. A loop $30^1$ serves to confine the upper end of the wire 25 to the locality of the latch.

Instead of employing helical buffer springs yieldingly to limit the swinging movements of the mill vane upon the mill head I preferably employ the simplified buffer illustrated and which includes a single strip of spring metal anchored at its intermediate portion, 31, to the mill head 4 and having its free ends 32 so positioned as to engage the mill vane just before it reaches the limits of its swinging movement upon the mill head.

While I have herein shown and particularly described the preferred embodiment of my invention I do not wish to be limited to the precise details of construction shown as changes may readily be made without departing from the spirit of my invention, but—

Having thus described my invention I claim as new and desire to secure by Letters Patent the following:—

1. A wind mill including a wind wheel; a mill vane; a supporting head for said wheel and vane and upon which the vane is mounted to open from and close toward the wheel; a brake including a brake drum moving with and co-axial with the wheel and a brake band which is mounted at one end upon the mill head; a lever mounted upon the mill vane; a connection between this lever and the unmounted end of the brake band; and a pulling element connected with the lever to pull upon said connection thereby to move the mill vane to closed position and to effect the application of the brake band to the brake drum.

2. A wind mill including a wind wheel; a mill vane; a supporting head for said wheel and vane and upon which the vane is mounted to open from and close toward the wheel; and two abutments carried by the mill head and integrally formed of a single strip of spring metal which is anchored at its intermediate portion to the mill head and between which abutments the mill vane is mounted to swing and which serve yieldingly to limit the extent of swinging movements of the vane.

3. A wind mill including a wind wheel; a mill vane; a supporting head for said wheel and vane and upon which the vane is mounted to open from and close toward the wheel; a connection between the mill head and mill vane for moving the mill vane to closed position, this connection including a lever which is carried by the mill vane; a pulling element connected with the lever to operate the lever to close the vane; and a latch carried by the mill vane and adapted to hold the lever in the position to which it is actuated to close the vane.

4. A wind mill including a wind wheel; a mill vane; a supporting head for said wheel and vane and upon which the vane is mounted to open from and close toward the wheel; a connection between the mill head and mill vane for moving the mill vane to closed position, this connection including a lever which is carried by the mill vane; a pulling element connected with the lever to operate the lever to close the vane; a latch carried by the mill vane and adapted to hold the lever in the position to which it is actuated to close the vane; and a motion limiting element carried by the pulling element and adapted to engage the latch when the vane is moved to open position to limit the idle movement of the lever.

In witness whereof, I hereunto subscribe my name this 30th day of Sept. A. D., 1914.

LA VERNE NOYES.

Witnesses:
L. C. WALKER,
F. E. SMITH.

Copies of this patent may be obtained for five cents each, by addressing the "Commissioner of Patents, Washington, D. C."